United States Patent
Henmi et al.

(10) Patent No.: US 11,851,738 B2
(45) Date of Patent: Dec. 26, 2023

(54) SOFT MAGNETIC MATERIAL AND METHOD FOR MANUFACTURING THE SAME

(71) Applicants: Murata Manufacturing Co., Ltd., Kyoto (JP); Tohoku Magnet Institute Co., Ltd., Miyagi (JP)

(72) Inventors: Kazuhiro Henmi, Nagaokakyo (JP); Toru Takahashi, Nagaokakyo (JP); Noriharu Yodoshi, Sendai (JP); Akihiro Makino, Sendai (JP)

(73) Assignees: Murata Manufacturing Co., Ltd., Kyoto (JP); ALPS ALPINE CO., LTD., Tokyo (JP)

( * ) Notice: Subject to any disclaimer, the term of this patent is extended or adjusted under 35 U.S.C. 154(b) by 1646 days.

(21) Appl. No.: 15/881,299

(22) Filed: Jan. 26, 2018

(65) Prior Publication Data

US 2018/0154434 A1   Jun. 7, 2018

Related U.S. Application Data

(63) Continuation of application No. PCT/JP2016/072053, filed on Jul. 27, 2016.

(30) Foreign Application Priority Data

Jul. 31, 2015   (JP) .................. 2015-152758

(51) Int. Cl.
*B22F 1/00* (2022.01)
*B22F 9/08* (2006.01)
(Continued)

(52) U.S. Cl.
CPC ............ *C22C 38/00* (2013.01); *B22F 1/08* (2022.01); *B22F 1/10* (2022.01); *B22F 5/00* (2013.01);
(Continued)

(58) Field of Classification Search
None
See application file for complete search history.

(56) References Cited

U.S. PATENT DOCUMENTS

2009/0184705 A1 *   7/2009   Yoshizawa .......... H01F 41/0226
                                                       252/62.55
2009/0266448 A1    10/2009   Ohta et al.
(Continued)

FOREIGN PATENT DOCUMENTS

CN    101263240 A    9/2008
CN    102741437 A    10/2012
(Continued)

OTHER PUBLICATIONS

Sharma (Scripta Materialia, vol. 95, 2015, p. 3-6). (Year: 2014).*
(Continued)

*Primary Examiner* — Xiaowei Su
(74) *Attorney, Agent, or Firm* — Studebaker & Brackett PC

(57) ABSTRACT

A soft magnetic powder according to the present disclosure comprises a particle which comprises a plurality of nano-sized crystallites and an amorphous phase existing around the crystallites, wherein the crystallites have an average grain diameter of 30 nm or less, and the amorphous phase has an average thickness of 30 nm or less; and wherein when a minor axis of a cross section of the particle is determined as r, an average Fe concentration in the amorphous phase is lower than an average Fe concentration in the crystallites in a region where a depth from a surface of the particle is 0.2 r or more and 0.4 r or less.

12 Claims, 1 Drawing Sheet

(51) Int. Cl.

| | |
|---|---|
| *B22F 5/00* | (2006.01) |
| *H01F 3/08* | (2006.01) |
| *H01F 41/02* | (2006.01) |
| *C22C 38/00* | (2006.01) |
| *C22C 45/02* | (2006.01) |
| *H01F 17/04* | (2006.01) |
| *H01F 1/153* | (2006.01) |
| *C22C 33/02* | (2006.01) |
| *B22F 1/10* | (2022.01) |
| *B22F 1/08* | (2022.01) |
| *C21D 6/00* | (2006.01) |
| *C22C 38/02* | (2006.01) |
| *C22C 38/10* | (2006.01) |
| *C22C 38/16* | (2006.01) |
| *H02K 1/02* | (2006.01) |

(52) U.S. Cl.
CPC .............. *B22F 9/082* (2013.01); *C21D 6/001* (2013.01); *C21D 6/007* (2013.01); *C21D 6/008* (2013.01); *C22C 33/0278* (2013.01); *C22C 38/002* (2013.01); *C22C 38/02* (2013.01); *C22C 38/105* (2013.01); *C22C 38/16* (2013.01); *C22C 45/02* (2013.01); *H01F 1/15308* (2013.01); *H01F 1/15333* (2013.01); *H01F 1/15375* (2013.01); *H01F 3/08* (2013.01); *H01F 17/04* (2013.01); *H01F 17/045* (2013.01); *H01F 41/0246* (2013.01); *B22F 2005/004* (2013.01); *B22F 2301/35* (2013.01); *B22F 2304/00* (2013.01); *B22F 2998/10* (2013.01); *C21D 2201/03* (2013.01); *C22C 2200/02* (2013.01); *C22C 2202/02* (2013.01); *H01F 2017/048* (2013.01); *H02K 1/02* (2013.01)

(56) References Cited

U.S. PATENT DOCUMENTS

| | | | | |
|---|---|---|---|---|
| 2010/0097171 A1* | 4/2010 | Urata | ..................... | C21D 6/007 420/83 |
| 2010/0230010 A1* | 9/2010 | Yoshizawa | .......... | H01F 1/15333 148/403 |

FOREIGN PATENT DOCUMENTS

| | | |
|---|---|---|
| JP | H06-264115 A | 9/1994 |
| JP | H09-017623 A | 1/1997 |
| JP | 2003-213331 A | 7/2003 |
| JP | 2005-064444 A | 3/2005 |
| JP | 2005-068451 A | 3/2005 |
| JP | 2007-270271 A | 10/2007 |
| JP | 2008-294411 A | 12/2008 |
| JP | 2013-067863 A | 4/2013 |
| JP | 2014-075529 A | 4/2014 |
| WO | 2007/032531 A1 | 3/2007 |
| WO | 2010021130 A1 | 2/2010 |

OTHER PUBLICATIONS

An Office Action mailed by the Japanese Patent Office dated Jul. 30, 2019, which corresponds to Japanese Patent No. 6,427,677 and is related to U.S. Appl. No. 15/881,299 with English language translation.

An Office Action mailed by the Chinese Patent Office dated May 22, 2019, which corresponds to Chinese Patent Application No. 201680044521.4 and is related to U.S. Appl. No. 15/881,299 with English language translation.

International Search Report issued in PCT/JP2016/072053; dated Oct. 18, 2016.

Written Opinion issued in PCT/JP2016/072053; dated Oct. 18, 2016.

Third Party Observation issued in PCT/JP2016/072053 with additional comments; submitted Aug. 28, 2017.

K. Hono et al.; "Research on Nanocrystallization of Amorphous Alloy by Atom Probe"; Materia; 1995; pp. 843-848; vol. 35, Issue No. 8.

Akihiro Makino et al.; "Low core losses and magnetic properties of Fe85-86Si1-2B8P4Cu1 nanocrystalline alloys with high B for power applications (invited)"; Journal of Applied Physics 109; 2011; pp. 07A302-1 to 07A302-5; American Institute of Physics.

An Office Action; "Notification of Reasons for Refusal," Mailed by the Japanese Patent Office dated Jul. 24, 2018, which corresponds to Japanese Patent Application No. 2017-532527 and is related to U.S. Appl. No. 15/881,299; with English language translation.

"Notification and the Submission of Observations (Information) from Third Parties" mailed by the Japanese Patent Office dated May 22, 2018, which corresponds to Japanese Patent Application No. 2017-532527 and is related to U.S. Appl. No. 15/881,299; with partial English translation.

Y.M. Chen et al., "Three-dimensional atom probe study of Fe-B-based nanocrystalline soft magnetic materials", Acta Materialia 57 (2009), pp. 4463-4472, Elsevier Ltd.

A. Takeuchi et al., "Thermodynamic analysis of binary Fe85B15 to quinary Fe85Si2B8P4Cu1 alloys for primary crystallizations of α-Fe in nanocristalline soft magnetic alloys", Journal of Applied Physics 117, 17B737 (2015), pp. 17B737-1 to 173B737-4, AIP Publishing LLC.

Caramella S. G. et al., "Estudio de propiedades magnéticas de la aleación Fe81Si6B8P4Cu1 elaborada con materiales de baja pureza", University Notebooks, Publicaciones Académicas de la Universidad Católica de Salta, vol. 7, Dec. 2014, pp. 19-26, http://200.10.180.182/index.php/CU/article/view/75/51.

Caramella S. G. et al., "Estudios estructurales y magnéticos de la aleación nanocristalina Fe81Si6B8P4Cu1 de bajo costo", Engineering Faculty Notebooks, Cuadernos de la Facultad de Ingeniería, Universidad Cátolica de Salta, vol. 8, Nov. 2014, pp. 17-22, ARGENTINA.

Parmanand Sharma et al., "Influence of microstructure on soft magnetic properties of low coreloss and high Bs.Fe85Si2B8P4Cu1 nanocrystalline alloy", Journal of Applied Physics, 115(17), pp. 17A340-1 to 17A340-3, Apr. 2014, AIP Publishing.

* cited by examiner

SOFT MAGNETIC MATERIAL AND METHOD FOR MANUFACTURING THE SAME

CROSS REFERENCE TO RELATED APPLICATION

The present application claims the benefit of priority to Japanese Patent Application No. 2015-152758 filed on Jul. 31, 2015, and is a Continuation Application of PCT Application No. PCT/JP2016/072053 filed on Jul. 27, 2016. The entire disclosure of each application is hereby incorporated herein by reference.

BACKGROUND

Technical Field

The present invention relates to a soft magnetic material and a method for manufacturing the same.

Description of Related Art

A soft magnetic powder having an amorphous structure is widely used in applications such as magnetic core materials for coil components used for electronic devices. As a method for manufacturing the soft magnetic powder, for example, a method for manufacturing a Fe-based soft magnetic alloy is known, the method comprising: rapidly cooling a molten metal of an alloy to form a rapidly-cooled body in a shape of thin strip or powder comprising an amorphous phase as a main phase; and crystalizing the rapidly-cooled body by subjecting a heat treatment thereto to form crystal grains comprising at least bcc-Fe and having an average crystal grain diameter of 50 nm or less so as to form a fine crystal structure, and the method being characterized by conducting a heat treatment at least two times to heat the rapidly-cooled body to a temperature which is higher than a crystallization start temperature and at which a compound phase is not substantially formed (Patent Literature 1 (JP 2003-213331 A)). The method described in Patent Literature 1 (JP 2003-213331 A) provides a soft magnetic alloy exhibiting an excellent soft magnetic property and having low loss and low coercive force by optimizing a heat treatment condition during the formation of the fine crystals to reduce an influence of self-heating when manufacturing the fine crystal alloy (nanocrystal alloy).

CITATION LIST

Patent Literature

Patent Literature 1: JP 2003-213331 A

SUMMARY

When the fine crystals are formed by the heat treatment as described above, temperature control during the heat treatment is difficult since the alloy material is self-heated. When the temperature during the heat treatment is too high due to the self-heating, the size of the fine crystals (nanocrystals) is increased, and as a result, a magnetic property thereof tends to be deteriorated. On the other hand, when the temperature during the heat treatment is too low, the nanocrystals cannot be formed. The present inventors made a study and found out that the heat treatment condition described in Patent Literature 1 (JP 2003-213331 A) could not sufficiently eliminate the influence of the self-heating and had difficulty in forming small-sized nanocrystals at high density.

An object of the present invention is to provide a soft magnetic powder which comprises small-sized nanocrystals formed therein at high density and has an excellent soft magnetic property, and a method for manufacturing the soft magnetic powder.

The present inventors made intensive studies and thus found that small-sized nanocrystals can be formed at high density by subjecting an alloy powder obtained by cooling a molten metal of a mother alloy to at least two times of heat treatments and setting a maximum temperature in the first heat treatment and a maximum temperature in the second heat treatment to appropriate values, and thus a soft magnetic powder having an excellent soft magnetic property can be obtained, and finally accomplished the present invention.

According to a first aspect of the present invention, there is provided a soft magnetic powder comprising a particle which comprises a plurality of crystallites and an amorphous phase existing around the crystallites,
wherein the crystallites have an average grain diameter of 30 nm or less, and the amorphous phase has an average thickness of 30 nm or less; and
wherein when a minor axis of a cross section of the particle is determined as r, an average Fe concentration in the amorphous phase is lower than an average Fe concentration in the crystallites in a region where a depth from a surface of the particle is 0.2 r or more and 0.4 r or less.

According to a second aspect of the present invention, there is provided a method for manufacturing a soft magnetic powder, the method comprising:
cooling a molten metal of a mother alloy to obtain an alloy powder composed mainly of an amorphous phase;
subjecting the alloy powder to a first heat treatment; and
subjecting the alloy powder subjected to the first heat treatment to a second heat treatment to obtain a soft magnetic powder,
wherein a maximum temperature T1 in the first heat treatment is a temperature at which an Avrami constant is 1.7 or more, and a maximum temperature T2 in the second heat treatment is lower than T1; and
wherein a crystallinity measured by a powder X-ray diffraction method is 20% or less for the alloy powder after the first heat treatment, and more than 20% for the soft magnetic powder after the second heat treatment.

According to a third aspect of the present invention, there is provided a magnetic core formed of a composite material comprising the soft magnetic powder described above and a resin.

According to a fourth aspect of the present invention, there is provided a method for manufacturing a magnetic core, the method comprising:
mixing the soft magnetic powder described above with a resin, and molding a mixture obtained thereby to obtain a molded body; and
heating the molded body.

According to a fifth aspect of the present invention, there is provided a coil component comprising the magnetic core described above and a coil conductor wound around the magnetic core.

According to a sixth aspect of the present invention, there is provided a coil component comprising:
a magnetic body part comprising as a main component a composite material which comprises the soft magnetic powder described above and a resin; and a coil conductor embedded in the magnetic body part.

The soft magnetic powder according to the present invention has an excellent soft magnetic property since it has the configuration described above. The method for manufacturing the soft magnetic powder according to the present invention can manufacture a soft magnetic powder comprising small-sized nanocrystals formed therein at high density and obtain a soft magnetic powder having an excellent soft magnetic property. A coil component having an excellent magnetic property can be obtained by use of the soft magnetic powder according to the present invention as a magnetic core material.

DETAILED DESCRIPTION OF THE PRESENT EMBODIMENTS

Hereinafter, embodiments of the present invention will be described. However, the following embodiments are intended for the purpose of illustration, and the present invention is not limited to the following embodiments.

Figure 1:
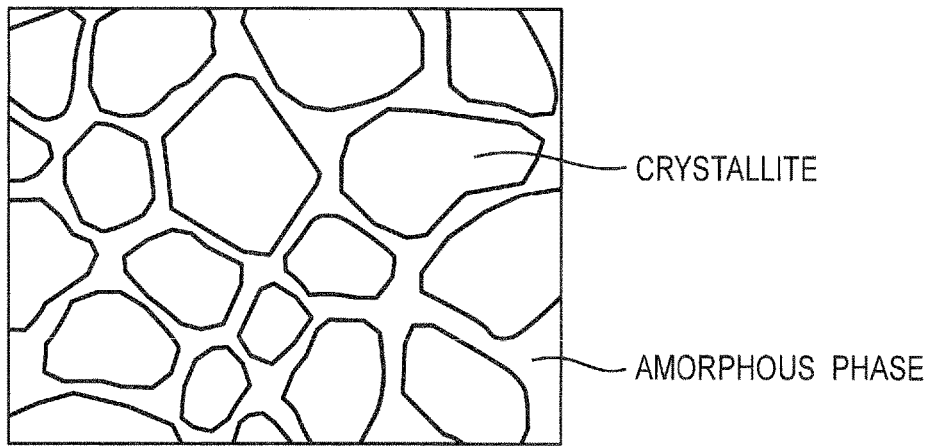
FIG. 1 is a schematic view of crystallites and an amorphous phase in a soft magnetic powder according to one embodiment of the present invention.

A soft magnetic powder according to one embodiment of the present invention comprises a particle comprising a plurality of crystallites and an amorphous phase existing around the crystallites. FIG. 1 shows a schematic view of the crystallites and the amorphous phase contained in the soft magnetic powder. The crystallites contained in the soft magnetic powder according to the embodiment have an average grain diameter of 30 nm or less. The crystallites may have the average grain diameter of 2 nm or more.

The average grain diameter of the crystallites can be evaluated from a transmission electron microscope (TEM) photograph. Specifically, the average grain diameter can be determined by measuring major axes DL and minor axes DS of the crystallites of n (n≥5) arbitrarily selected in a region where a depth from a surface of the particle is 0.2 r or more and 0.4 r or less, when a minor axis of a cross section of the particle contained in the soft magnetic powder is determined as r, in a TEM photograph of the soft magnetic powder; and making a calculation by use of the following formula (2). In the present specification, "a depth from a surface of a particle" means a depth in a direction normal to the surface of the particle.

$$D=\Sigma(DL+DS)/2n \quad (2)$$

(D: average grain diameter of crystallites)

On the other hand, the amorphous phase contained in the soft magnetic powder according to the embodiment has an average thickness of 30 nm or less. The amorphous phase may have an average thickness of 1 nm or more. In the present specification, "a thickness of an amorphous phase" means a thickness of the amorphous phase existing between the crystallites adjacent to each other. The average thickness of the amorphous phase can be evaluated from a TEM photograph. Specifically, in a TEM photograph of the soft magnetic powder, when the minor axis of the cross section of the particle contained in the soft magnetic powder is determined as r, a length of a line segment connecting by a shortest distance a boundary between a crystal phase of one crystallite and the surrounding amorphous phase and a boundary between a crystal phase of a crystallite adjacent to the one crystallite and the surrounding amorphous phase is measured for the crystallites of n (n≥5) arbitrarily selected in the region where the depth from the surface of the particle is 0.2 r or more and 0.4 r or less. An average value of the lengths of the line segments is determined as the average thickness of the amorphous phase.

Since the average grain diameter of the crystallites and the average thickness of the amorphous phase contained in the soft magnetic powder are within the above described ranges, the soft magnetic powder according to the embodiment comprises nanosized crystallites existing therein at high density, and thus has a high soft magnetic property. Therefore, a coil component having a high magnetic property can be obtained when the soft magnetic powder according to the embodiment is used as a magnetic core material. Specifically, a core loss can be reduced, and high magnetic permeability and high saturation magnetic flux density can be achieved.

When the minor axis of the cross section of the particle contained in the soft magnetic powder according to the embodiment is determined as r, an average Fe concentration in the amorphous phase is lower than an average Fe concentration in the crystallites in the region where the depth from the surface of the particle is 0.2 r or more and 0.4 r or less. The average Fe concentrations in the amorphous phase and the crystallites can be evaluated by a combination of TEM measurement and an energy dispersive X-ray spectroscopy (EDS). Specifically, in a TEM photograph of the soft magnetic powder, when the minor axis of the cross section of the particle contained in the soft magnetic powder is determined as r, Fe concentration at a center of a crystallite is determined by EDS measurement for crystallites of n (n≥5) arbitrarily selected in the region where the depth from the surface of the particle is 0.2 r or more and 0.4 r or less, and an average value of the Fe concentrations is determined as the average Fe concentration in the crystallites. Also, a Fe concentration at the center of the line segment connecting by a shortest distance the boundary between the crystal phase of one crystallite and the surrounding amorphous phase and the boundary between the crystal phase of the crystallite adjacent to the one crystallite and the surrounding amorphous phase is determined by EDS measurement, and an average value of the Fe concentrations is determined as the average Fe concentration in the amorphous phase.

In the region where the depth from the surface of the particle contained in the soft magnetic powder is 0.2 r or more and 0.4 r or less, a ratio of the average Fe concentration in the amorphous phase to the average Fe concentration in the crystallites is preferably 0.90 or less. When the ratio of the average Fe concentration is 0.90 or less, the Fe concentration in the crystallites is increased, and thus, the saturation magnetic flux density is increased.

Figure 2:
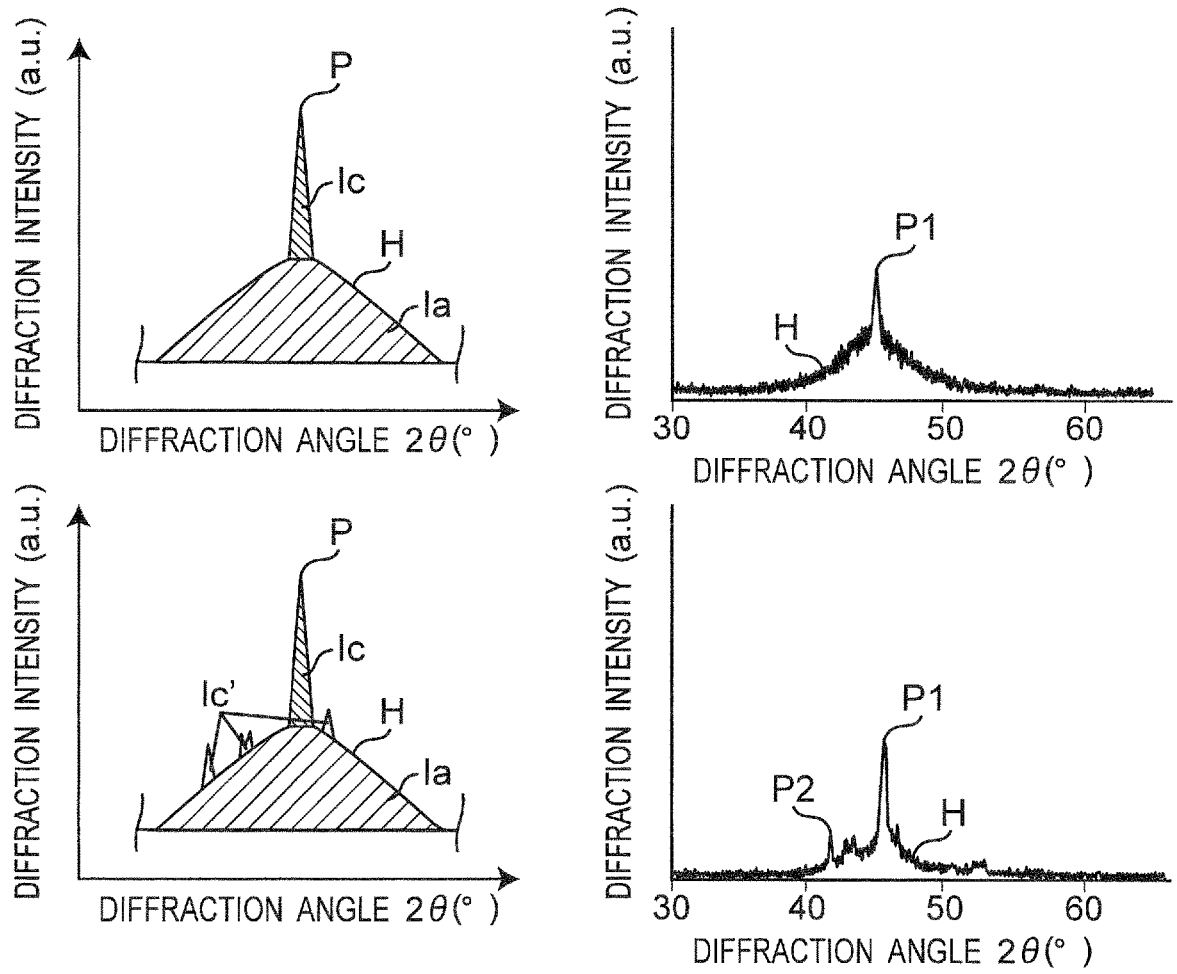
FIG. 2 is diagrams for explaining an analysis method of X-ray diffraction patterns.

A crystallinity of the soft magnetic powder is preferably high since the soft magnetic property is improved as the crystallinity of the soft magnetic powder is higher. The crystallinity of the soft magnetic powder is preferably more than 20% and more preferably 30% or more. When the crystallinity of the soft magnetic powder is 30% or more, the soft magnetic property can be further improved. The crystallinity of the soft magnetic powder can be measured with a powder X-ray diffraction method by a procedure described below. FIG. 2 shows schematic views for explaining an analysis method of X-ray diffraction patterns. In FIG. 2, a crystal peak indicating a body-centered cubic structure is indicated by P, a crystal peak indicating a crystal structure with low symmetry (lowly symmetry) is indicated by P2, and a halo region indicating an amorphous property is indicated by H. The crystallinity can be calculated by use of the following formula (3) based on the X-ray diffraction spectrum of the soft magnetic powder.

$$X=\{Ic/(Ic+Ic'+Ia)\}\times 100 \quad (3)$$

(X: crystallinity, Ic: area of the crystal peak region indicating the body-centered cubic structure, Ic': area of the crystal peak region indicating the crystal structure with low symmetry (lowly symmetry), Ia: area of the halo region indicating amorphous property)

The crystal peak P indicating the body-centered cubic structure is a peak in a range of a diffraction angle 2θ from Fe 110 plane of 44.5° or more and 45.5° or less.

The soft magnetic powder preferably comprises a crystal phase mainly having a body-centered cubic structure. When the crystal phase mainly has a body-centered cubic structure, the soft magnetic property is further improved. Whether or not the crystal phase mainly has a body-centered cubic structure can be evaluated by a powder X-ray diffraction method. In an X-ray diffraction spectrum, a peak area ratio Y of a crystal peak indicating a crystal structure with low symmetry can be represented by the following formula (4):

$$Y=\{Ic'/(Ic+Ic'+Ia)\}\times 100 \quad (4)$$

When the value of Y is 1 or less, it can be considered that the crystal phase mainly has a body-centered cubic structure.

In one example, the particle contained in the soft magnetic powder preferably comprises an alloy composition represented by a general formula $Fe_aSi_bB_cP_dCu_eM_fC_gCr_h$. In the formula, a, b, c, d, e, f, g and h satisfy 71.0≤(a+f+g+h)≤81.0, 0.14≤b/c≤5, 0≤d≤14, 0<e≤1.4, d≤0.8(a+f+g+h)−50, e<−0.1(a+d+f+g+h)+10, 0≤f≤12, 0≤g≤8, 0≤h≤10, and a+b+c+d+e+f+g+h=100; and M is at least one element of Ni and Co. In a case where the particle contained in the soft magnetic powder comprises the alloy composition having the above-mentioned composition, the amorphous phase can be formed in a stable manner, and the soft magnetic property is further improved.

In the alloy composition, a portion of Fe is preferably substituted with at least one element of Ni and Co (that is, 0<f≤12 in the general formula). The magnetic property can be further improved by the substitution of a portion of Fe with Ni and/or Co.

Also, in the alloy composition, a portion of Fe is preferably substituted with C (that is, 0<g≤8 in the general formula). The amorphous phase is likely to be formed by the substitution of a portion of Fe with C. In addition, an equivalent magnetic property can be obtained even when a portion of Fe is substituted with C, and thus, a raw material cost can be reduced by the substitution of a portion of Fe with C which is inexpensive.

Also, in the alloy composition, a portion of Fe is preferably substituted with Cr (that is, 0<h≤10 in the general formula). Cr tends to be oxidized more easily than Fe. Therefore, when a portion of Fe is substituted with Cr, Cr is preferentially oxidized, and thus, the oxidation of Fe can be prevented and the deterioration of the magnetic property can be reduced thereby.

In another example, the particle contained in the soft magnetic powder preferably comprises an alloy composition represented by a general formula $Fe_aSi_bB_cP_dCu_eM'_f$. In the formula, a', b', c', d', e' and f' satisfy 81≤(a'+f')≤86, 2≤b'≤8, 6≤c'≤10, 2≤d'≤5, 0.4≤e'≤1.4, 0.08≤e'/d'≤0.8 and 0≤f'≤3; and M' is at least one element of Ti, Zr, Hf, Nb, Ta, Mo, W, Cr, Co, Ni, Al, Mn, Ag, Zn, Sn, As, Sb, Bi, Y, N, O and rare-earth elements. In a case where the particle contained in the soft magnetic powder comprises the alloy composition having the above-mentioned composition, the amorphous phase can be formed in a stable manner, and the soft magnetic property is further improved.

Next, a method for manufacturing the soft magnetic powder according to one embodiment of the present invention will be described. The method for manufacturing the soft magnetic powder according to the embodiment comprises: cooling a molten metal of a mother alloy to obtain an alloy powder composed mainly of an amorphous phase; subjecting the alloy powder to a first heat treatment; and subjecting the alloy powder subjected to the first heat treatment to a second heat treatment to obtain a soft magnetic powder. Each of the steps will be described in detail below.

First, the molten metal of the mother alloy is cooled to obtain the alloy powder composed mainly of the amorphous phase. The mother alloy can be prepared by weighing raw materials such as Fe, Si, Fe—B alloy, Fe—P alloy, Cu, Ni, Co, C and Cr so as to be a predetermined alloy composition, heating to a temperature equal to or more than the melting point and melting them, and then cooling the melt. In one example, the mother alloy preferably has a composition represented by a general formula $Fe_aSi_bB_cP_dCu_eM_fC_gCr_h$. In the formula, a, b, c, d, e, f, g and h satisfy 71.0≤(a+f+g+h)≤81.0, 0.14b/c≤5, 0≤d≤14, 0<e≤1.4, d≤0.8(a+f+g+h)−50, e<−0.1(a+d+f+g+h)+10, 0≤f≤12, 0≤g≤8, 0≤h≤10, and a+b+c+d+e+f+g+h=100; and M is at least one element of Ni and Co. The amorphous phase can be formed in a stable manner by the mother alloy having the above-mentioned composition, and the soft magnetic powder having a higher soft magnetic property can be obtained. Also, the mother alloy having the above-mentioned composition is suitable in a case where the molten metal of the mother alloy is pulverized with a high-pressure gas stream in the preparation of the alloy powder described later.

In another example, the mother alloy preferably has a composition represented by a general formula $Fe_aSi_bB_cP_dCu_eM'_f$. In the formula, a', b', c', d', e' and f' satisfy 81≤(a'+f')≤86, 2≤b'≤8, 6≤c'≤10, 2≤d'≤5, 0.4≤e'≤1.4, 0.08≤e'/d'≤0.8 and 0≤f'≤3; and M' is at least one element of Ti, Zr, Hf, Nb, Ta, Mo, W, Cr, Co, Ni, Al, Mn, Ag, Zn, Sn, As, Sb, Bi, Y, N, O and rare-earth elements. The amorphous phase can be formed in a stable manner by the mother alloy having the above-mentioned composition, and the soft magnetic powder having a higher soft magnetic property can be obtained. Also, the mother alloy having the above-mentioned composition is suitable in a case where the molten metal of the mother alloy is pulverized with a high-pressure water stream or a case where the molten metal of the mother alloy is pulverized with a high-pressure gas stream and cooled with water in the preparation of the alloy powder described later.

The alloy powder composed mainly of the amorphous phase is obtained by cooling the molten metal of the mother alloy. The alloy powder can be prepared by, for example, pulverizing the molten metal of the mother alloy with a high-pressure water stream or a high-pressure gas stream and cooling it. In other words, the alloy powder can be formed by spraying high-pressure water or high-pressure gas into the molten metal of the mother alloy. The high-pressure gas is a gas having a pressure of 1 MPa or more and 10 MPa or less. Specifically, the mother alloy is crushed to a size of about 3 cm so as to be easily melted, and then put into a crucible of an atomization device such as a gas atomization device, and the mother alloy is melted by a high-frequency induction heating to obtain the molten metal. The inside of the atomization device is preferably set to an inert atmosphere such as an argon atmosphere. Then, the molten metal is pulverized by spraying a jet fluid (that is, the high-pressure water stream or the high-pressure gas stream) into the molten metal, and cooled (rapidly cooled) to obtain the alloy powder composed mainly of the amorphous phase. As the jet fluid, argon gas, nitrogen gas or the like can be used, for example. The cooling can be conducted by use of a cooling medium such as water or gas. It is preferably to use the gas (for example, an inert gas such as argon gas or nitrogen gas) as the cooling medium.

Next, the alloy powder is subjected to the first heat treatment. The first heat treatment can be conducted by use of a heating device such as an infrared heating device. An atmosphere in the heating device is preferably an atmosphere of an inert gas such as helium gas. As an alternative method, the atmosphere in the heating device may also be a mixed gas atmosphere in which hydrogen gas is added to helium gas. The metal element can be prevented from being oxidized during the heat treatment by addition of hydrogen gas. Hydrogen gas may be added by 3% in terms of partial pressure.

The crystallites are formed in the alloy powder by the heat treatment of the alloy powder composed mainly of the amorphous phase. If the size of the crystallites is too large, the magnetic property is deteriorated. Therefore, it is desirable to form nanosized fine crystallites at high density. It is necessary to appropriately control the temperature of the heat treatment in order to form nanosized fine crystallites at high density. However, the control of the heat treatment temperature is difficult since the alloy powder is self-heated during the heat treatment. When the heat treatment temperature is too high due to the self-heating, the size of the crystallites is increased, and the magnetic property is deteriorated. On the other hand, when the heat treatment temperature is too low, the crystallites cannot be formed. The present inventors have found that the nanosized fine crystallites can be formed at high density by setting a maximum temperature T1 in the first heat treatment to a temperature at which an Avrami constant is 1.7 or more, and setting a maximum temperature T2 in the second heat treatment described later to a temperature lower than T1. The Avrami constant is a parameter indicating the mode of the crystallization. The crystallization is less likely to proceed as the Avrami constant is decreased, and the crystallization is likely to proceed as the Avrami constant is increased. When the crystallinity is constant, the crystallites having smaller size can be formed at higher density as the Avrami constant is increased. The Avrami constant of the alloy powder can be evaluated with a differential scanning calorimetry (DSC) by a procedure described below. An isothermal DSC measurement of the alloy powder (rate of temperature increase: 400° C./min., isothermal holding measurement time: 60 minutes) is conducted twice in argon atmosphere by use of a differential scanning calorimeter. Since the alloy powder is completely crystallized by the first measurement, an exothermal reaction caused by the self-heating does not occur in the second measurement. The amount of heat generation of the alloy powder sample is calculated from the difference between the DSC curve obtained by the first measurement and the DSC curve obtained by the second measurement by use of the DSC curve obtained by the second measurement as a background. In addition, an accumulated amount of heat generation from the start of the isothermal measurement is evaluated as a function of time t. The accumulated amount of heat generation at t=60 minutes is defined as a total amount of heat generation. A maximum Avrami constant at each temperature is calculated based on the following formula (5).

$$N = d\{\ln(-\ln(1-x))\}/d\{\ln(t-\tau)\} \qquad (5)$$

(x: crystallization reaction ratio (=(accumulated amount of heat generation)/(total amount of heat generation), t: isothermal holding time (second), τ: incubation time (second) (a time at x=0.01))

The maximum value of the Avrami constants calculated as described above is determined as an Avrami constant at each temperature.

The maximum temperature T1 in the first heat treatment is set to a temperature at which the Avrami constant is 1.7 or more. Nanosized fine crystallites can be formed at high density by setting the temperature of the first heat treatment as described above.

The crystallinity of the alloy powder after the first heat treatment measured by the powder X-ray diffraction method is 20% or less. The self-heating of the alloy powder in the first heat treatment can be reduced by the crystallinity after the first heat treatment of a relatively low value of 20% or less. The crystallinity can be calculated with the powder X-ray diffraction method by use of the formula (3) described above.

It is preferable to conduct the first heat treatment for a time equal to or more than a time at which the crystallization reaction ratio is 0.01 or more and equal to or less than a time at which the crystallization reaction ratio is 0.4 or less. When the time of the first heat treatment is within the above-described range, the crystallinity of the alloy powder after the first heat treatment is easily set to an appropriate value.

Next, the alloy powder subjected to the first heat treatment is subjected to the second heat treatment to obtain the soft magnetic powder. The second heat treatment can be conducted by use of a heating device such as an infrared heating device. The first heat treatment and the second heat treatment may be conducted continuously in the same heating device, or may be conducted by use of different heating devices, separately. In the second heat treatment, an atmosphere inside the heating device is preferably an atmosphere of an inert gas such as argon gas.

The crystallites are grown in the second heat treatment, and thus the soft magnetic powder having a desired crystallinity can be obtained. The maximum temperature T2 in the second heat treatment is set to a temperature lower than T1 in order to reduce the self-heating of the alloy powder in the second heat treatment.

The second heat treatment is conducted preferably for 1 minute or more and 120 minutes or less and more preferably for 5 minutes or more and 60 minutes or less. When the time of the second heat treatment is within the above-described range, the soft magnetic powder comprising nanosized fine crystallites formed therein at high density can be obtained, and the soft magnetic property is further improved.

The crystallinity of the soft magnetic powder after the second heat treatment measured by the powder X-ray diffraction method is more than 20%. When the crystallinity of the soft magnetic powder is within the above-described range, the soft magnetic powder having an excellent soft magnetic property can be obtained.

Next, a magnetic core according to one embodiment of the present invention will be described. The magnetic core according to this embodiment is formed of a composite material comprising the soft magnetic powder according to the present invention and a resin. As the resin, an epoxy resin, a phenol resin, a silicone resin and the like can be used, for example. The amount of the soft magnetic powder in the composite material is preferably 60% by volume or more and 90% by volume or less. When the amount of the soft magnetic powder is within the above-described range, the magnetic core having an excellent magnetic property can be obtained. The dimension and the shape of the magnetic core are not particularly limited, and can be set appropriately according to an intended application. The magnetic core may be, for example, a toroidal core having an outer diameter of 13 mm, an inner diameter of 8 mm and a thickness of 2.5 mm.

Next, a method for manufacturing a magnetic core according to one embodiment of the present invention will be described. The method for manufacturing the magnetic core according to the embodiment comprises: mixing the soft magnetic powder according to the present invention with a resin such as an epoxy resin, a phenol resin and a silicone resin, and molding a mixture obtained thereby to obtain a molded body; and heating the molded body. The molded body can be obtained by, for example, press-molding the mixture comprising the soft magnetic powder and the resin at a pressure of about 100 MPa. The dimension and the shape of the molded body are not particularly limited, and can be set appropriately according to the dimension and the shape of the desired magnetic core. The heating temperature of the molded body can be set appropriately according to the type of the resin to be used and the like.

Next, a coil component according to one embodiment of the present invention will be described. The coil component according to the embodiment comprises the magnetic core according to the present invention and a coil conductor wound around the magnetic core. The coil conductor can be formed by winding a metal wire such as a copper wire coated with enamel around the magnetic core. The coil component according to the embodiment has an excellent magnetic property since it comprises the soft magnetic powder according to the present invention used as a magnetic core material.

Next, a coil component according to another embodiment of the present invention will be described. The coil component according to the embodiment comprises: a magnetic body part comprising as a main component a composite material which comprises the soft magnetic powder according to the present invention and a resin such as an epoxy resin, a phenol resin and a silicone resin; and a coil conductor embedded in the magnetic body part. The coil component according to the embodiment has an excellent magnetic property since it comprises the soft magnetic powder according to the present invention used as a magnetic core material. The amount of the soft magnetic powder in the composite material is preferably 60% by volume or more and 90% by volume or less. When the amount of the soft magnetic powder is within the above-described range, the magnetic property of the coil component can be further improved. The coil component according to the embodiment can be manufactured by a procedure described below, for example. First, a plurality of sheets of the composite material are formed. Then, the coil conductor is disposed between the sheets. The sheets are thermally pressure-bonded in a state where the coil conductor is disposed between the sheets to obtain the coil component. A stator core for a motor can also be formed by use of the soft magnetic powder according to the present invention. The motor comprises a coil component comprising a coil conductor wound around an armature tooth, a rotor rotatably disposed inside the coil component, and a stator core comprising a plurality of armature teeth disposed at equal intervals on the same circumference.

The soft magnetic powder according to the present invention has a high saturation magnetic flux density and a low magnetic loss, and thus, a high-quality motor having a low power loss can be obtained by a stator core formed of the soft magnetic powder according to the present invention.

Examples

Soft magnetic powders of examples 1 to 37 were prepared by procedures described below.

(Preparation of Alloy Powder)

As raw materials for the mother alloy, Fe, Si, Fe—B alloy, Fe—P alloy, Cu, Ni, Co, C and Cr were used. These raw materials were weighted so as to be predetermined alloy compositions. The raw materials were weighted so that the alloy composition was $Fe_{80.3}Si_4B_7P_8Cu_{0.7}$ for examples 1 to 17. The raw materials were weighted so that the alloy compositions were the compositions described in Table 3 for examples 18 to 27, Table 6 for examples 28 to 32, and Table 9 for examples 33 to 37, respectively. The weighed raw materials were heated to a temperature equal to or more than the melting point and melted in a high-frequency induction heating furnace, and then the melt was poured into a casting mold made of copper and cooled to prepare the mother alloy. The mother alloy was crushed to a size of about 3 cm, and put into a crucible of a gas atomization device. Then, the mother alloy was melted by the high-frequency induction heating to obtain the molten metal. An atmosphere inside the gas atomization device was set to argon atmosphere. Then, the molten metal was pulverized by spraying a jet fluid of argon gas into the molten metal, and then rapidly cooled with cooling water to obtain the alloy powders of examples 1 to 37.

(Calculation of Avrami Constants)

For each of the alloy powders of examples 1 to 16 and 18 to 37, an isothermal DSC measurement (rate of temperature increase: 400° C./min., isothermal holding measurement time: 60 minutes) was conducted twice in argon atmosphere by use of a differential scanning calorimeter (DSC 8500 manufactured by PerkinElmer Inc.). The amount of heat generation of the alloy powder sample was calculated from the difference between the DSC curve obtained by the first measurement and the DSC curve obtained by the second measurement by use of the DSC curve obtained by the second measurement as a background. The accumulated amount of heat generation from the start of the isothermal measurement was evaluated as a function of time t. The accumulated amount of heat generation at t=60 minutes was defined as a total amount of heat generation. A maximum Avrami constant at each temperature was calculated based on the formula (5) described above. The results are shown in Tables 1, 4, 7 and 10. Since the first heat treatment was not conducted for the alloy powder of example 17 as described later, the DSC measurement and the calculation of the Avrami constant were not conducted for example 17.

(First Heat Treatment)

The alloy powders of examples 1 to 16 and 18 to 37 were subjected to the first heat treatment by use of an infrared heating device. The maximum temperatures in the first heat treatment were set to temperatures shown in Tables 1, 4, 7 and 10. The atmosphere in the heating device was set to a mixed gas atmosphere in which hydrogen gas was added by 3% in terms of partial pressure to helium gas. The first heat treatment was conducted for 10 seconds. The first heat treatment was not conducted for the alloy powder of example 17.

(First XRD Measurement)

The X-ray diffraction spectrum was measured for the alloy powders after the first heat treatment in a range of a diffraction angle 2θ of 30° or more and 65° or less, under a measurement condition of a step width of 0.02° and a step time of 2 seconds, by use of a powder X-ray diffraction device (RINT2200 manufactured by Rigaku Corporation). The powder structure phase of each sample was identified from the obtained X-ray diffraction spectrum. The crystallinities X of the alloy powders after the first heat treatment were also calculated by use of the formula (3) described above based on the X-ray diffraction spectrum. The results are shown in Tables 1, 4, 7 and 10.

(Second Heat Treatment)

The alloy powders after the first heat treatment were subjected to the second heat treatment by use of the infrared heating device to obtain the soft magnetic powders of examples 1 to 37. The maximum temperatures in the second heat treatment were set to temperatures shown in Tables 1, 4, 7 and 10. The atmosphere in the heating device was set to argon atmosphere. The second heat treatment was conducted for 10 minutes. The second heat treatment was not conducted for the alloy powder of example 17.

(Second XRD Measurement)

The X-ray diffraction spectrum was measured for the soft magnetic powders of examples 1 to 37 obtained by the second heat treatment in a range of a diffraction angle 2θ of 30° or more and 65° or less, under a measurement condition of a step width of 0.01° and a step time of 2 seconds, by use of the powder X-ray diffraction device (RINT2200 manufactured by Rigaku Corporation). The crystallinities X of the soft magnetic powders were calculated by use of the formula (3) described above based on the obtained X-ray diffraction spectrum. The results are shown in Tables 1, 4, 7 and 10.

Furthermore, the peak area ratio Y of the crystal peak indicating the crystal structure with low symmetry was calculated by use of the formula (4) described above. The results are shown in Tables 1, 4, 7 and 10. In Tables 1, 4, 7 and 10, the "crystal structure" means a crystal structure of the soft magnetic powder, "bcc" indicates that the soft magnetic powder mainly has a body-centered cubic structure, and "bcc+lsp" means that the soft magnetic powder has a phase with low symmetry (lowly symmetry phase) in addition to the body-centered cubic structure.

(Measurement of Average Thickness of Amorphous Phase)

Transmission electron microscope (TEM) photographs of the soft magnetic powders of examples 1 to 37 were taken. The average grain diameter of the crystallites and the average thickness of the amorphous phase were evaluated by use of the TEM photograph. The average grain diameter of the crystallites was determined by measuring the major axes DL and the minor axes DS of the crystallites of n (n≥5) arbitrarily selected in the region where the depth from the surface of the particle was 0.2 r or more and 0.4 r or less, when the minor axis of the cross section of the particle contained in the soft magnetic powder was determined as r, in the TEM photograph of each sample; and making calculation by use of the formula (2) described above. Furthermore, in the TEM photograph of each sample, when the minor axis of the cross section of the particle contained in the soft magnetic powder was determined as r, the length of the line segment connecting by a shortest distance the boundary between the crystal phase of one crystallite and the surrounding amorphous phase and the boundary between the crystal phase of the crystallite adjacent to the one crystallite and the surrounding amorphous phase was measured for the crystallites of n (n≥5) arbitrarily selected in the region where the depth from the surface of the particle was 0.2 r or more and 0.4 r or less. An average value of the lengths of the line segments was determined as the average thickness of the amorphous phase. The results are shown in Tables 2, 5, 8 and 11. No crystallite was detected in the soft magnetic powder of example 17, and thus, the average grain diameter of the crystallites and the average thickness of the amorphous phase could not be determined for example 17.

(Measurement of Average Fe Concentration)

The average Fe concentrations in the amorphous phase and in the crystallites were evaluated by TEM-EDS for the soft magnetic powders of examples 1 to 37. In the TEM photograph of each sample, when the minor axis of the cross section of the particle contained in the soft magnetic powder was determined as r, the Fe concentration at the center of the crystallite was determined by the EDS measurement for the crystallites of n (n≥5) arbitrarily selected in the region where the depth from the surface of the particle was 0.2 r or more and 0.4 r or less, and an average value thereof was determined as the average Fe concentration in the crystallites. Also, the Fe concentration at the center of the line segment connecting by a shortest distance the boundary between the crystal phase of the one crystallite and the surrounding amorphous phase and the boundary between the crystal phase of the crystallite adjacent to the one crystallite and the surrounding amorphous phase was determined by EDS measurement, and an average value thereof was determined as the average Fe concentration in the amorphous phase. Furthermore, ratios of the average Fe concentration in the amorphous phase to the average Fe concentration in the crystallites (indicated by "Fe concentration ratio" in the Tables) were evaluated. The results are shown in Tables 2, 5, 8 and 11. No crystal phase was detected in the soft magnetic powder of example 17, and thus, the average Fe concentration in the crystallites could not be determined for example 17.

(Preparation of Coil Component)

Coil components were prepared by procedures described below by use of the soft magnetic powders of examples 1 to 37. First, 3 parts by weight of epoxy resin was added to 100 parts by weight of each sample (ratio of epoxy resin: 15% by volume) and press-molded at a pressure of 100 MPa to prepare a toroidal core having an outer diameter of 13 mm, an inner diameter of 8 mm, and a thickness of 2.5 mm. Then, a copper wire having a wire diameter of 0.3 mm coated with enamel was doubly wound around the outer periphery of the toroidal core so that both of the number of turns of a primary side winding wire for excitation and the number of turns of a secondary side winding wire for voltage detection were 16 to prepare the coil components of examples 1 to 37.

(Measurement of Core Loss)

Core losses (magnetic losses) of the coil components at an applied magnetic field of 30 mT and a measurement frequency of 1 MHz were determined by use of a B-H analyzer SY-8217 manufactured by Iwatsu Test Instruments Corporation. The results are shown in Tables 2, 5, 8 and 11. The examples with "*" in Tables 1 to 11 are comparative examples.

TABLE 1

| Sample No. | 1st heat treatment Maximum temperature T1 [° C.] | 1st heat treatment Maximum Avrami constant | 1st XRD Crystallinity [%] | 2nd heat treatment Maximum temperature T2 [° C.] | 2nd XRD Crystallinity [%] | 2nd XRD Crystal structure | Y |
|---|---|---|---|---|---|---|---|
| 1* | 500 | 1.6 | 70 | 440 | 100 | bcc + lsp | 15 |
| 2* | 490 | 2.1 | 44 | 440 | 97 | bcc + lsp | 10 |
| 3 | 480 | 2.3 | 19 | 440 | 99 | bcc | 0 |
| 4 | 470 | 2.5 | 13 | 440 | 100 | bcc | 0 |
| 5 | 460 | 2.1 | 6 | 420 | 100 | bcc | 0 |
| 6 | 460 | 2.1 | 6 | 440 | 98 | bcc | 0 |
| 7 | 460 | 2.1 | 6 | 450 | 99 | bcc | 0 |
| 8* | 460 | 2.1 | 6 | 480 | 97 | bcc | 0 |
| 9* | 460 | 2.1 | 6 | 500 | 100 | bcc + lsp | 9 |
| 10* | 460 | 2.1 | 6 | 540 | 99 | bcc + lsp | 10 |
| 11 | 450 | 1.9 | 1 | 420 | 96 | bcc | 0 |
| 12 | 440 | 2.1 | 0 | 420 | 99 | bcc | 0 |
| 13 | 430 | 2.1 | 0 | 420 | 95 | bcc | 0 |
| 14* | 420 | 1.7 | 0 | 380 | 18 | bcc | 0 |
| 15* | 400 | 1.7 | 0 | 380 | 0 | bcc | 0 |
| 16* | 500 | 1.7 | 70 | 0 | 70 | bcc | 0 |
| 17* | X | X | 0 | X | 0 | not detected | not detected |

TABLE 2

| | TEM | TEM | TEM-EDS | TEM-EDS | | |
|---|---|---|---|---|---|---|
| | Crystallite | Amorphous phase | Average Fe concentration | Average Fe concentration | | |
| Sample No. | average grain diameter [nm] | average thickness [nm] | Crystallite [at. %] | Amorphous phase [at. %] | Fe concentration ratio | Core loss [kW/m³] |
| 1* | 44 | 3 | 82 | 76 | 0.93 | 5526 |
| 2* | 31 | 9 | 83 | 75 | 0.90 | 4529 |
| 3 | 26 | 9 | 88 | 72 | 0.82 | 1700 |
| 4 | 29 | 6 | 86 | 71 | 0.83 | 1513 |
| 5 | 19 | 15 | 89 | 70 | 0.79 | 1546 |
| 6 | 23 | 9 | 89 | 73 | 0.82 | 1753 |
| 7 | 22 | 6 | 87 | 72 | 0.83 | 1949 |
| 8* | 35 | 3 | 88 | 72 | 0.82 | 3568 |
| 9* | 32 | 6 | 90 | 70 | 0.78 | 4178 |
| 10* | 37 | 3 | 92 | 71 | 0.77 | 4474 |
| 11 | 21 | 15 | 88 | 74 | 0.84 | 1693 |
| 12 | 17 | 24 | 85 | 75 | 0.88 | 1906 |
| 13 | 15 | 21 | 86 | 74 | 0.86 | 1592 |
| 14* | 17 | 39 | 84 | 71 | 0.85 | 2512 |
| 15* | 13 | 57 | 85 | 72 | 0.85 | 2163 |
| 16* | 36 | 33 | 80 | 77 | 0.96 | 3835 |
| 17* | not detected | cannot defined | not detected | 80 | — | 2614 |

As shown in Tables 1 and 2, the coil component using the soft magnetic powder of example 1 prepared by setting the maximum temperature T1 in the first heat treatment to a temperature at which the Avrami constant was lower than 1.7 had a large core loss of more than 2000 kW/m³. This is considered to be caused by the fact that the average grain diameter of the crystallites present in the soft magnetic powder was larger than 30 nm. The coil components using the soft magnetic powders of examples 1, 2 and 16 each of which had the crystallinity of more than 20% after the first heat treatment had a core loss of more than 2000 kW/m³. This is considered to be caused by the fact that the average grain diameters of the crystallites present in the soft magnetic powders were larger than 30 nm. The coil components using the soft magnetic powders of examples 8 to 10 each prepared with the maximum temperature T2 in the second heat treatment which was higher than the maximum temperature T1 in the first heat treatment had a core loss of more than 2000 kW/m³. This is considered to be caused by the fact that the average grain diameters of the crystallites present in the soft magnetic powders were larger than 30 nm. The coil components using the soft magnetic powders of examples 14 and 15 each of which had the crystallinity of less than 20% after the second heat treatment had a core loss of more than 2000 kW/m³. This is considered to be caused by the fact that the average thicknesses of the amorphous phases present in the soft magnetic powders were larger than 30 nm. The coil component using the soft magnetic powder of example 17 prepared without the first and the second heat treatments had a core loss of more than 2000 kW/m³. This is considered to be caused by the fact that fine crystallite was not formed in the soft magnetic powder of example 17. In contrast, the coil components using the soft magnetic powders of examples 3 to 7 and 11 to 13 had a core loss of 2000 kW/m³ or less. This proves that the core loss could be reduced by use of the soft magnetic powder according to the present invention.

As shown in Tables 4 and 5, the coil component using the soft magnetic powder of example 27 which had the crystallinity of more than 20% after the first heat treatment had a core loss of more than 2000 kW/m³. This is considered to be caused by the fact that the average grain diameter of the crystallites present in the soft magnetic powder was larger than 30 nm. In contrast, the coil components using the soft magnetic powders of examples 18 to 26 had a core loss of 2000 kW/m³ or less. This proves that the core loss could be reduced by use of the soft magnetic powder according to the present invention.

TABLE 3

Composition formula: $Fe_aSi_bB_cP_dCu_eM_f$

| ex. | M | a | b | c | d | e | f |
|---|---|---|---|---|---|---|---|
| 18 | — | 80.3 | 4 | 7 | 8 | 0.7 | 0.0 |
| 19 | Co | 77.3 | 4 | 7 | 8 | 0.7 | 3.0 |
| 20 | Co | 71.3 | 4 | 7 | 8 | 0.7 | 9.0 |
| 21 | Co | 68.3 | 4 | 7 | 8 | 0.7 | 12.0 |
| 22 | Ni | 77.3 | 4 | 7 | 8 | 0.7 | 3.0 |
| 23 | Ni | 74.3 | 4 | 7 | 8 | 0.7 | 6.0 |
| 24 | Ni | 71.3 | 4 | 7 | 8 | 0.7 | 9.0 |
| 25 | Ni | 68.3 | 4 | 7 | 8 | 0.7 | 12.0 |
| 26 | Co, Ni | 74.3 | 4 | 7 | 8 | 0.7 | 6.0 |
| 27* | Co, Ni | 67.3 | 4 | 7 | 8 | 0.7 | 13.0 |

TABLE 6

Composition formula: $Fe_aSi_bB_cP_dCu_eC_f$

| ex. | a | b | c | d | e | f |
|---|---|---|---|---|---|---|
| 28 | 80.3 | 4 | 7 | 8 | 0.7 | 0.0 |
| 29 | 78.3 | 4 | 7 | 8 | 0.7 | 2.0 |
| 30 | 76.3 | 4 | 7 | 8 | 0.7 | 4.0 |
| 31 | 72.3 | 4 | 7 | 8 | 0.7 | 8.0 |
| 32* | 70.3 | 4 | 7 | 8 | 0.7 | 10.0 |

TABLE 4

| | 1st heat treatment | | | 2nd heat treatment | | | |
|---|---|---|---|---|---|---|---|
| ex. | Maximum temperature T1 [° C.] | Maximum Avrami constant | 1st XRD Crystallinity [%] | Maximum temperature T2 [° C.] | 2nd XRD Crystallinity [%] | Crystal structure | Y |
| 18 | 470 | 2.0 | 9 | 440 | 98 | bcc | 0 |
| 19 | 470 | 2.1 | 10 | 440 | 97 | bcc | 0 |
| 20 | 470 | 2.5 | 13 | 440 | 97 | bcc | 0 |
| 21 | 470 | 1.9 | 6 | 440 | 99 | bcc | 0 |
| 22 | 470 | 2.1 | 6 | 440 | 98 | bcc | 0 |
| 23 | 470 | 2.1 | 6 | 440 | 92 | bcc | 0 |
| 24 | 470 | 2.1 | 6 | 440 | 95 | bcc | 0 |
| 25 | 470 | 2.1 | 6 | 440 | 78 | bcc | 0 |
| 26 | 470 | 2.1 | 19 | 440 | 99 | bcc | 0 |
| 27* | 470 | 2 | 41 | 440 | 56 | bcc + Isp | 4 |

TABLE 5

| | TEM | | TEM-EDS | | | |
|---|---|---|---|---|---|---|
| | Crystallite average | Amorphous phase | Average Fe concentration | | | |
| ex. | grain diameter [nm] | average thickness [nm] | Crystallite [at. %] | Amorphous phase [at. %] | Fe concentration ratio | Core loss [kW/m³] |
| 18 | 25 | 6 | 88 | 71 | 0.81 | 1567 |
| 19 | 26 | 9 | 85 | 70 | 0.82 | 1814 |
| 20 | 29 | 9 | 85 | 70 | 0.82 | 1543 |
| 21 | 19 | 12 | 92 | 70 | 0.76 | 1728 |
| 22 | 19 | 9 | 89 | 78 | 0.88 | 1560 |
| 23 | 24 | 6 | 83 | 69 | 0.83 | 1483 |
| 24 | 29 | 3 | 88 | 72 | 0.82 | 1790 |
| 25 | 24 | 27 | 82 | 75 | 0.91 | 1837 |
| 26 | 21 | 6 | 87 | 73 | 0.84 | 1528 |
| 27* | 39 | 27 | 82 | 74 | 0.90 | 2756 |

TABLE 7

| ex. | 1st heat treatment Maximum temperature T1 [° C.] | 1st heat treatment Maximum Avrami constant | 1st XRD Crystallinity [%] | 2nd heat treatment Maximum temperature T2 [° C.] | 2nd XRD Crystallinity [%] | 2nd XRD Crystal structure | Y |
|---|---|---|---|---|---|---|---|
| 28 | 470 | 2.3 | 17 | 440 | 97 | bcc | 0 |
| 29 | 470 | 2.1 | 7 | 440 | 91 | bcc | 0 |
| 30 | 470 | 2.1 | 8 | 440 | 98 | bcc | 0 |
| 31 | 470 | 2.1 | 1 | 440 | 95 | bcc | 0 |
| 32* | 470 | 1.6 | 46 | 440 | 71 | bcc + lsp | 2 |

TABLE 8

| ex. | TEM Crystallite average grain diameter [nm] | TEM Amorphous phase average thickness [nm] | TEM-EDS Average Fe concentration Crystallite [at. %] | TEM-EDS Average Fe concentration Amorphous phase [at. %] | Fe concentration ratio | Core loss [kW/m$^3$] |
|---|---|---|---|---|---|---|
| 28 | 9 | 9 | 91 | 75 | 0.82 | 1577 |
| 29 | 16 | 12 | 93 | 72 | 0.78 | 1648 |
| 30 | 23 | 21 | 86 | 74 | 0.86 | 1767 |
| 31 | 17 | 12 | 87 | 74 | 0.85 | 1524 |
| 32* | 55 | 36 | 80 | 72 | 0.90 | 2256 |

As shown in Tables 7 and 8, the coil component using the soft magnetic powder of example 32 prepared by setting the maximum temperature T1 in the first heat treatment to a temperature at which the Avrami constant was lower than 1.7 had a core loss of more than 2000 kW/m$^3$. This is considered to be caused by the facts that the average grain diameter of the crystallites present in the soft magnetic powder was larger than 30 nm and that the average thickness of the amorphous phase present in the soft magnetic powder was larger than 30 nm. In contrast, the coil components using the soft magnetic powders of examples 28 to 31 had a core loss of 2000 kW/m$^3$ or less. This proves that the core loss could be reduced by use of the soft magnetic powder according to the present invention.

TABLE 9

Composition formula: $Fe_aSi_bB_cP_dCu_eCr_f$

| ex. | a | b | c | d | e | f |
|---|---|---|---|---|---|---|
| 33 | 80.3 | 4 | 7 | 8 | 0.7 | 0.0 |
| 34 | 78.3 | 4 | 7 | 8 | 0.7 | 2.0 |
| 35 | 76.3 | 4 | 7 | 8 | 0.7 | 4.0 |
| 36 | 70.3 | 4 | 7 | 8 | 0.7 | 10.0 |
| 37* | 68.3 | 4 | 7 | 8 | 0.7 | 12.0 |

TABLE 10

| ex. | 1st heat treatment Maximum temperature T1 [° C.] | 1st heat treatment Maximum Avrami constant | 1st XRD Crystallinity [%] | 2nd heat treatment Maximum temperature T2 [° C.] | 2nd XRD Crystallinity [%] | 2nd XRD Crystal structure | Y |
|---|---|---|---|---|---|---|---|
| 33 | 470 | 2.6 | 13 | 440 | 97 | bcc | 0 |
| 34 | 470 | 2.7 | 6 | 440 | 98 | bcc | 0 |
| 35 | 470 | 2.2 | 16 | 440 | 99 | bcc | 0 |
| 36 | 470 | 2.5 | 19 | 440 | 95 | bcc + lsp | 0 |
| 37* | 470 | 2.0 | 53 | 440 | 79 | bcc + lsp | 2 |

TABLE 11

| | TEM | | TEM-EDS | | | |
|---|---|---|---|---|---|---|
| | Crystallite average | Amorphous phase | Average Fe concentration | | | |
| ex. | grain diameter [nm] | average thickness [nm] | Crystallite [at. %] | Amorphous phase [at. %] | Fe concentration ratio | Core loss [kW/m$^3$] |
| 33 | 15 | 27 | 97 | 75 | 0.77 | 1485 |
| 34 | 26 | 9 | 98 | 74 | 0.76 | 1479 |
| 35 | 26 | 21 | 89 | 79 | 0.89 | 1343 |
| 36 | 29 | 9 | 98 | 74 | 0.76 | 1589 |
| 37* | 47 | 33 | 85 | 79 | 0.93 | 2142 |

As shown in Tables 10 and 11, the coil component using the soft magnetic powder of example 37 which had the crystallinity of more than 20% after the first heat treatment had a core loss of more than 2000 kW/m$^3$. This is considered to be caused by the facts that the average grain diameter of the crystallites present in the soft magnetic powder was larger than 30 nm and that the average thickness of the amorphous phase present in the soft magnetic powder was larger than 30 nm. In contrast, the coil components using the soft magnetic powders of examples 33 to 36 had a core loss of 2000 kW/m$^3$ or less. This proves that the core loss could be reduced by use of the soft magnetic powder according to the present invention.

A coil component having an excellent magnetic property can be obtained by use of the soft magnetic powder according to the present invention as a magnetic core material, and the coil component can be used for electronic devices for which high performance is required.

What is claimed is:

1. A soft magnetic powder comprising a particle which comprises a plurality of crystallites and an amorphous phase existing around the crystallites,
    wherein the crystallites have an average grain diameter of 30 nm or less, and the amorphous phase has an average thickness of 30 nm or less;
    wherein when a minor axis of a cross section of the particle is determined as r, an average Fe concentration in the amorphous phase is lower than an average Fe concentration in the crystallites in a region where a depth from a surface of the particle is 0.2 r or more and 0.4 r or less; and
    wherein the particle comprises an alloy composition represented by a general formula $Fe_a Si_b B_c P_d Cu_e M_f Cr_h$, where a, b, c, d, e, f, g and h satisfy $71.0 \leq (a+f+g+h) \leq 81.0$, $0.14 \leq b/c \leq 5$, $0 \leq d \leq 14$, $0 < e \leq 1.4$, $d \leq 0.8(a+f+g+h)-50$, $e < -0.1(a+d+f+g+h)+10$, $0 \leq f \leq 12$, $0 \leq g \leq 8$, $0 \leq h \leq 10$, and $a+b+c+d+e+f+g+h=100$, and a, b, c, d, e, f, g and h are in terms of at %; and M is at least one element of Ni and Co.

2. The soft magnetic powder according to claim 1, wherein a ratio of the average Fe concentration in the amorphous phase to the average Fe concentration in the crystallites is 0.90 or less in the region where the depth from the surface of the particle is 0.2 r or more and 0.4 r or less.

3. The soft magnetic powder according to claim 1, wherein the soft magnetic powder has a crystallinity measured by a powder X-ray diffraction method of 30% or more.

4. The soft magnetic powder according to claim 3, wherein the soft magnetic powder comprises a crystal phase mainly having a body-centered cubic structure.

5. The soft magnetic powder according to claim 1 satisfying $0<f \leq 12$ in the general formula.

6. The soft magnetic powder according to claim 1 satisfying $0<g \leq 8$ in the general formula.

7. The soft magnetic powder according to claim 1 satisfying $0<h \leq 10$ in the general formula.

8. A magnetic core formed of a composite material comprising the soft magnetic powder according to claim 1 and a resin.

9. The magnetic core according to claim 8, wherein a content of the soft magnetic powder in the composite material is 60% by volume or more and 90% by volume or less.

10. A coil component comprising the magnetic core according to claim 8 and a coil conductor wound around the magnetic core.

11. A coil component comprising:
    a magnetic body part comprising as a main component a composite material which comprises the soft magnetic powder according to claim 1 and a resin; and a coil conductor embedded in the magnetic body part.

12. The coil component according to claim 11, wherein a content of the soft magnetic powder in the composite material is 60% by volume or more and 90% by volume or less.

* * * * *